(12) United States Patent
Miyamoto

(10) Patent No.: US 11,412,103 B2
(45) Date of Patent: Aug. 9, 2022

(54) IMAGE PROCESSING APPARATUS FOR DISPLAYING AN ANALYSIS RESULT OF A MULTI-CROPPING SCAN PROCESSING

(71) Applicant: CANON KABUSHIKI KAISHA, Tokyo (JP)

(72) Inventor: Daijiro Miyamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/778,017

(22) Filed: Jan. 31, 2020

(65) Prior Publication Data

US 2020/0259971 A1    Aug. 13, 2020

(30) Foreign Application Priority Data

Feb. 13, 2019  (JP) .............................. JP2019-023573

(51) Int. Cl.
   *H04N 1/00*    (2006.01)
(52) U.S. Cl.
   CPC ..... *H04N 1/00748* (2013.01); *H04N 1/00453* (2013.01); *H04N 1/00456* (2013.01); *H04N 1/00721* (2013.01); *H04N 1/00779* (2013.01); *H04N 1/00785* (2013.01)
(58) Field of Classification Search
   CPC ........... H04N 1/00748; H04N 1/00456; H04N 1/00469; H04N 1/2036; H04N 1/2038; H04N 1/00442
   See application file for complete search history.

(56) References Cited

U.S. PATENT DOCUMENTS

| 10,432,820 B2 | 10/2019 | Shimamura et al. |
| 2010/0271465 A1* | 10/2010 | Lee .................. H04N 13/172 348/51 |
| 2017/0186201 A1* | 6/2017 | Obayashi ............... G06V 20/35 |
| 2018/0115680 A1* | 4/2018 | Shimamura ........ H04N 1/32464 |
| 2018/0174324 A1* | 6/2018 | Miyauchi ............. G06V 30/414 |
| 2018/0205851 A1* | 7/2018 | Hattori ................. H04N 1/4413 |
| 2019/0124229 A1* | 4/2019 | Ishino .................. H04N 1/3873 |

FOREIGN PATENT DOCUMENTS

JP    2018-074180 A    5/2018

* cited by examiner

*Primary Examiner* — Benjamin O Dulaney
(74) *Attorney, Agent, or Firm* — Venable LLP

(57) ABSTRACT

According to the technology of the present disclosure, in a case where multiple documents are placed on a document positioning plate, it is possible to display document images on a UI screen in such a manner that the user can easily check the correspondence relationship between the document images being displayed on the UI screen and the corresponding documents placed on the document positioning plate. An image processing apparatus according to the present disclosure includes a processor causing the image processing apparatus to perform: acquiring position information of each of a plurality of document image areas, and information of an analyzing result obtained by analysis of document image data corresponding to each of the plurality of document image areas; and controlling the information of the analyzing result corresponding to one of the plurality of document image areas to be displayed together with the scanned image data on a display apparatus.

16 Claims, 21 Drawing Sheets

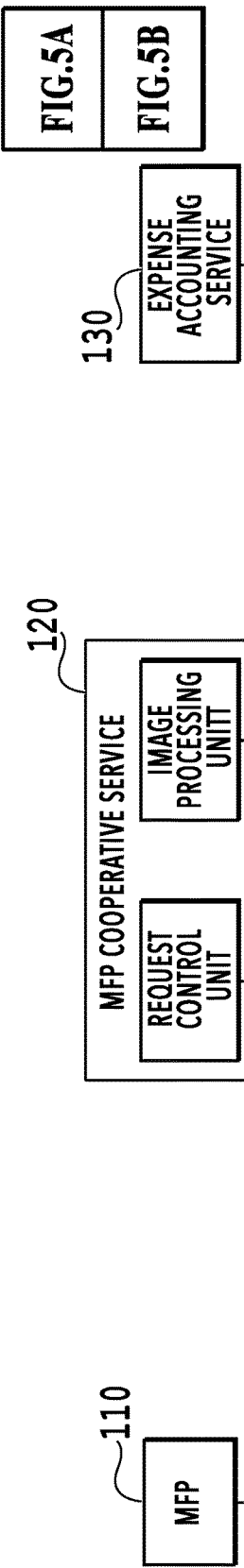

```
{
  "Delegators": [
    {
      "UserID": "UserB@xxxxx.com",
      "UserName": "UserB"
    },
    {
      "UserID": "UserC@xxxxx.com",
      "UserName": "UserC"
    },
    {
      "UserID": "UserD@xxxxx.com",
      "UserName": "UserD"
    }
  ]
}
```

RESPONSE TO AN ANALYSIS REQUEST OF A SCANNED IMAGE

```
{
    "JobID" : "12345678"
}
```

RESPONSE TO CHECKING OF A PROCESSING STATUS
IN A CASE OF BEING UNDER PROCESSING

```
{
   "Status": "processing"
}
```

FIG.12A

RESPONSE TO CHECKING OF A PROCESSING STATUS
IN A CASE WHERE THE PROCESSING IS COMPLETED

```
{
        "Status" : "completed",
        "Images" : [
                {
                        "ImageID" : "image0001",
                        "ContentsType" : "Receipt",
                        "ReceiptData" : [
                                {
                                        "Date" : "20180313",
                                        "Amount" : "10000"
                                }
                        ],
                        "Points" : [2049, 361, 4665, 241, 4793, 1345, 2169, 1465]
                },
                {
                        "ImageID" : "image0002",
                        "ContentsType" : "Receipt",
                        "ReceiptData" : [
                                {
                                        "Date" : "20180311",
                                        "Amount" : "2000"
                                }
                        ],
                        "Points" : [2921, 1825, 3977, 1897, 3857, 3353, 2825, 3265]
                },
                {
                        "ImageID" : "image0003",
                        "ContentsType" : "Receipt",
                        "ReceiptData" : [
                                {
                                        "Date" : "20180312",
                                        "Amount" : "432"
                                }
                        ],
                        "Points" : [777, 337, 1721, 329, 1711, 2057, 769, 2049]
                }
        ]
}
```

FIG.12B

RESPONSE TO ACQUISITION OF METADATA INFORMATION

```
{
    "ExpenseTypes": [
        {
            "ID": "0001",
            "Name": "Hotel"
        },
        {
            "ID": "0002",
            "Name": "Car Rental"
        },
        {
            "ID": "0003",
            "Name": "Fuel"
        },
        {
            "ID": "0004",
            "Name": "Parking"
        },
        {
            "ID": "0005",
            "Name": "Taxi"
        },
        {
            "ID": "0007",
            "Name": "Breakfast"
        },
        {
            "ID": "0008",
            "Name": "Lunch"
        },
        {
            "ID": "0009",
            "Name": "Dinner"
        },
        {
            "ID": "0010",
            "Name": "Business Meals"
        }
    ]
}
```

FIG.13

```
{
    "ExpenseTypeID": "0005",
    "TransactionDate": "20180311",
    "Amount": "2000",
    "Location": "Tokyo"
}
```

METADATA SETTING

ORDER : ARRANGEMENT (FROM THE LEFT) ▶

1400

EXPENSE TYPE: Dinner ▶
TRANSACTION DATE: 2018/3/13
MONEY AMOUNT: 10000
LOCATION: TOKYO

RETURN   NEXT
         TRANSMIT

IMAGE PROCESSING APPARATUS FOR DISPLAYING AN ANALYSIS RESULT OF A MULTI-CROPPING SCAN PROCESSING

BACKGROUND OF THE INVENTION

Field of the Invention

The technology of the present disclosure relates to a technology for displaying document image data, which are generated by scanning multiple documents, in an organized manner.

Description of the Related Art

Conventionally, there has been multi-cropping processing in which multiple documents such as receipts, business cards, or various kinds of certificates are arranged and placed on a document positioning plate of a scanner apparatus, so as to generate document image data from the obtained scanned image data by cropping image areas corresponding to the respective documents. In this processing, document detection processing is performed on scanned image data, which is image data corresponding to the entire document positioning plate, and an image area corresponding to each of the detected documents is cropped, so as to generate document image data.

Japanese Patent Laid-Open No. 2018-74180 discloses a technology for determining the order of pages of multiple document image data cropped by multi-cropping processing and converting the multiple document image data into one file. In Japanese Patent Laid-Open No. 2018-74180, the order of pages is determined by use of position coordinates, dimensions, similarity levels between images, or the like, of regions corresponding to originals detected by multi-cropping processing. Furthermore, the cropped document image data are displayed in order according to the determined order of pages, and a UI screen is displayed to allow the user to check the order and change the order.

However, according to the technique disclosed in Japanese Patent Laid-Open No. 2018-74180, multiple document images are simply displayed in the determined page order. Therefore, there is an issue that it is difficult to grasp, only from the display of the UI screen, which of the documents placed on the document positioning plate each of the displayed document images corresponds to.

SUMMARY OF THE INVENTION

The technology of the present disclosure includes: acquiring position information of each of a plurality of document image areas, which are identified by multi-cropping processing performed on scanned image data, and information of an analyzing result obtained by analysis of document image data corresponding to each of the plurality of document image areas; and controlling the information of the analyzing result corresponding to one of the plurality of document image areas to be displayed together with the scanned image data on a display apparatus, wherein the scanned image data is displayed in such a manner that the one of the plurality of document image areas corresponding to the information of the analyzing result being displayed is identifiable.

Further features of the present invention will become apparent from the following description of exemplary embodiments with reference to the attached drawings.

BRIEF DESCRIPTION OF THE DRAWINGS

FIG. 5 is a diagram representing a relationship between FIGS. 5A and 5B;

FIGS. 5A and 5B are sequence diagrams representing communication performed in processing among apparatuses;

FIG. 8 is a diagram representing response data to a request for proxy application eligible person information;

FIG. 11 is a diagram representing response data to an analysis request of a scanned image;

FIG. 12A is a diagram representing response data to a request for checking a processing status;

FIG. 12B is a diagram representing response data to a request for checking a processing status;

FIG. 13 is a diagram representing response data to an acquisition request of metadata;

FIG. 15 is a diagram representing request data for a metadata setting request;

FIG. 16 is a diagram representing a relationship between FIGS. 16A and 16B;

FIG. 18 is a diagram representing a metadata setting screen of the MFP; and

DESCRIPTION OF THE EMBODIMENTS

Hereinafter, an explanation is given of an embodiment for implementing the technology of the present disclosure with reference to the drawings. Noted that the following embodiment does not limit the invention according to the scope of the patent claims and that every combination of the characteristics explained in the embodiment is not essential to the solution means of the invention.

<Overall Configuration>

Figure 1:
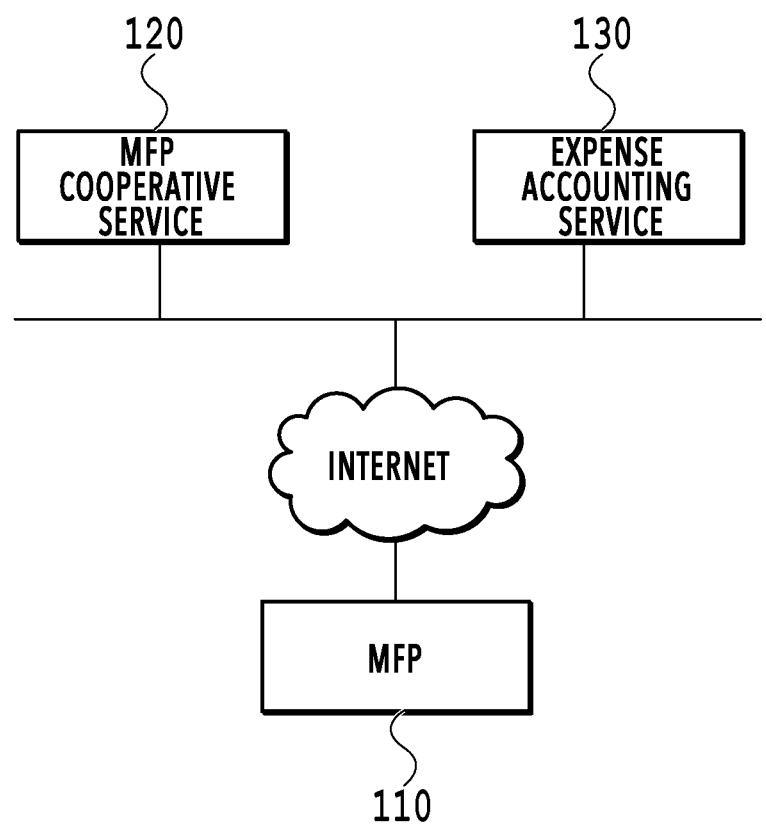
FIG. 1 is an overall view of a system.

FIG. 1 is a diagram representing an overall configuration of an image processing system according to the present embodiment. The image processing system includes an MFP 110, an MFP cooperative service 120, and an expense accounting service 130. The MFP 110 is communicably connected to servers for providing various kinds of services on the Internet via a LAN (Local Area Network).

An MFP (Multifunction Peripheral) 110 is a multifunction peripheral having multiple functions, such as a scanner and a printer, and is an example of an image processing apparatus.

The MFP cooperative service 120 is an example of a service having a function of saving an image file obtained by scanning by the MFP 110 on its own server and a function of transferring the image file to a service that is capable of saving a file, such as another storage service.

The expense accounting service 130 is a service that provides a function for a company to efficiently perform expense accounting. In the expense accounting service 130, it is possible to save and manage image data of a scanned receipt and metadata, which is additional information of the receipt, and to set operator information of a proxy applicant who scans a receipt on behalf of the actual applicant (user to be the processing target), for example.

Although the image processing system according to the present embodiment is configured with the MFP 110 and the MFP cooperative service 120, the image processing system according to the present embodiment is not limited to the embodiment. For example, the MFP 110 may also have a role of the MFP cooperative service 120. Furthermore, there may be such a connection form in which the MFP cooperative service 120 is arranged in a server on a LAN, not on the Internet.

<Hardware Configuration of MFP>

Figure 2:
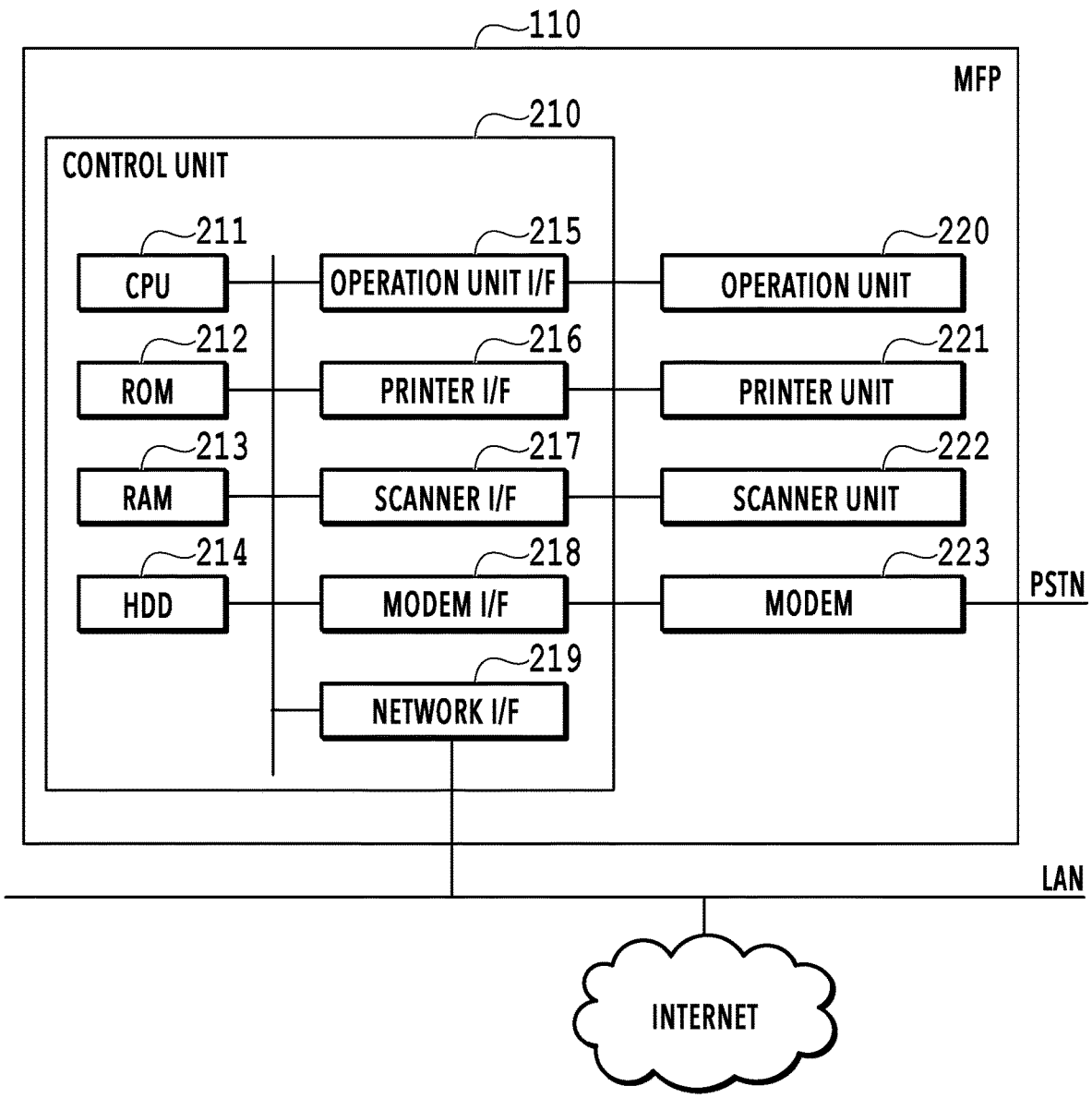
FIG. 2 is a hardware configuration diagram of an MFP.

FIG. 2 is a hardware configuration diagram of the MFP 110. The MFP 110 includes a control unit 210, an operation unit 220, a printer unit 221, a scanner unit 222, and a modem 223. The control unit 210 includes the following units 211 to 219 and controls the overall operation of the MFP 110. The CPU 211 reads out a control program stored in the ROM 212 to execute and control various functions of the MFP 110 such as reading, printing, and communicating. The RAM 213 is used as a temporary memory area such as a main memory or work area of the CPU 211. Note that, although one CPU 211 executes each of the processing represented in the later-described flowchart by use of one memory (RAM 213 or HDD 214) in the present embodiment, the present embodiment is not limited thereto. For example, each of the processing may be executed by cooperation of multiple CPUs and multiples RAMs or HDDs. The HDD 214 is a large-capacity storage unit that stores image data and various programs.

The operation unit I/F 215 is an interface that connects the operation unit 220 and the control unit 210. The operation unit 220 includes a touch panel, a keyboard, and the like, and accepts an operation, an input, or an instruction by the user. The printer I/F 216 is an interface that connects the printer unit 221 and the control unit 210. Image data for printing is transferred from the control unit 210 to the printer unit 221 via the printer I/F 216 and printed on a printing medium such as a printing sheet. The scanner I/F 217 is an interface that connects the scanner unit 222 and the control unit 210. The scanner unit 222 reads a document that is set on a document positioning plate or an ADF (Auto Document Feeder), each of which is not illustrated in the drawings, and generates image data, in order to input the image data to the control unit 210 via the scanner I/F 217. The MFP 110 is capable of printing (copying) image data generated by the scanner unit 222 by use of the printer unit 221 as well as performing file transmission or email transmission of the image data. The modem I/F 218 is an interface that connects the modem 223 and the control unit 210. The modem 223 is capable of performing facsimile communication of image data with a facsimile apparatus on PSTN. The network I/F 219 is an interface that connects the control unit 210 (MFP 110) to a LAN. The MFP 110 is capable of receiving various types of information and transmitting image data and information to a service on the Internet by use of the network I/F 219.

<Hardware Configuration of MFP Cooperative Service and Expense Accounting Service>

Figure 3:
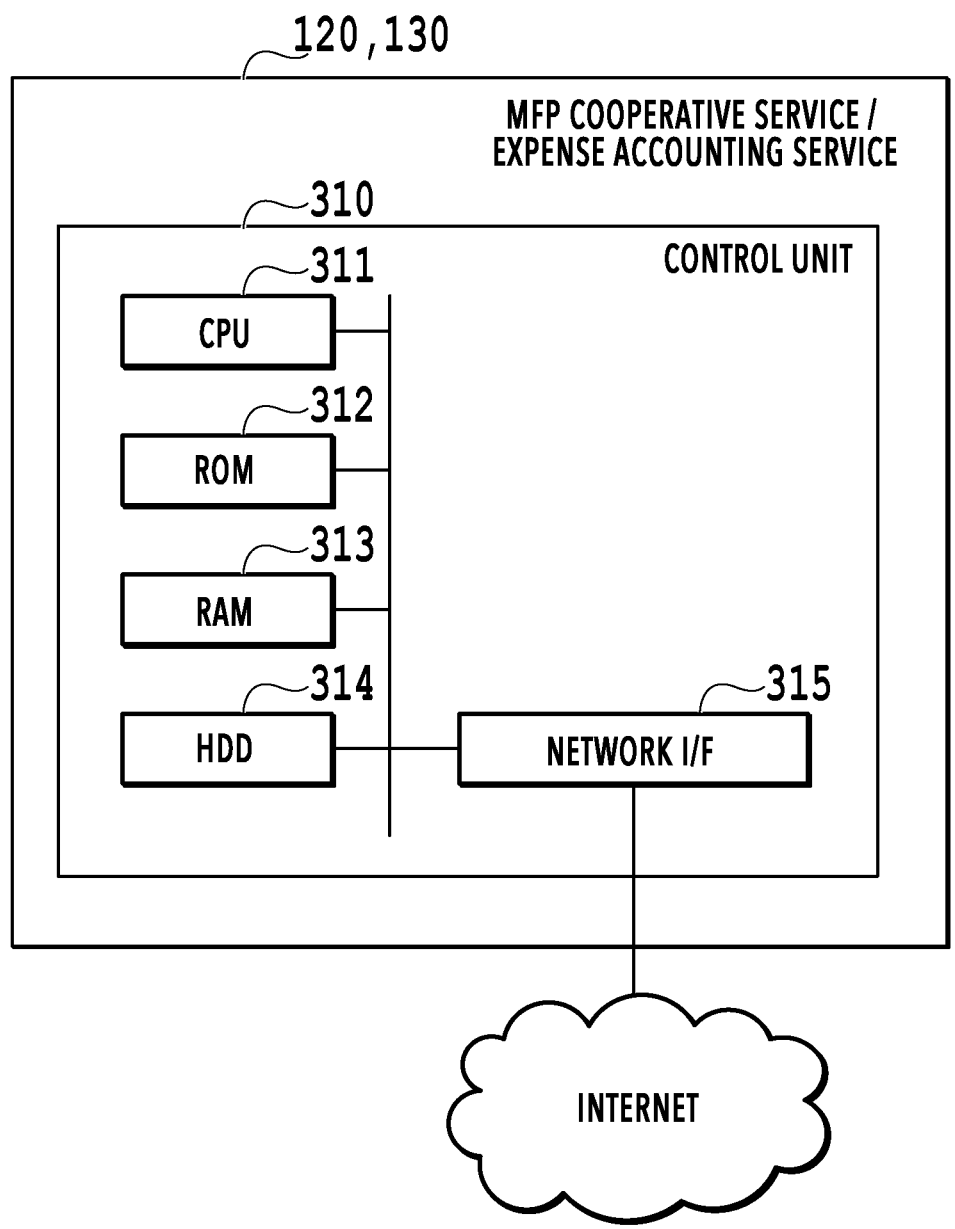
FIG. 3 is a hardware configuration diagram of an MFP cooperative service and an expense accounting service.

FIG. 3 is a hardware configuration diagram of the MFP cooperative service 120 and the expense accounting service 130 in the present embodiment. Needless to say, although the MFP cooperative service 120 and the expense accounting service 130 can be realized in the same hardware configuration, the MFP cooperative service 120 and the expense accounting service 130 may be realized in different configurations.

The MFP cooperative service 120 and the expense accounting service 130 are configured with a CPU 311, a ROM 312, a RAM 313, an HDD 314, and a network I/F 315. The CPU 311 controls the overall operation by reading out a control program stored in the ROM 312 and executing various kinds of processing. The RAM 313 is used as a temporary memory area such as a main memory or work area of the CPU 311. The HDD 314 is a large-capacity storage unit that stores image data and various programs. The network I/F 315 is an interface for connecting the MFP cooperative service 120 and the expense accounting service 130 to the Internet. The MFP cooperative service 120 and the expense accounting service 130 are capable of transmitting and receiving various kinds of information in response to a processing request received from another apparatus (such as the MFP 110) via the network I/F 315.

<Software Configuration of Image Processing System>

Figure 4:
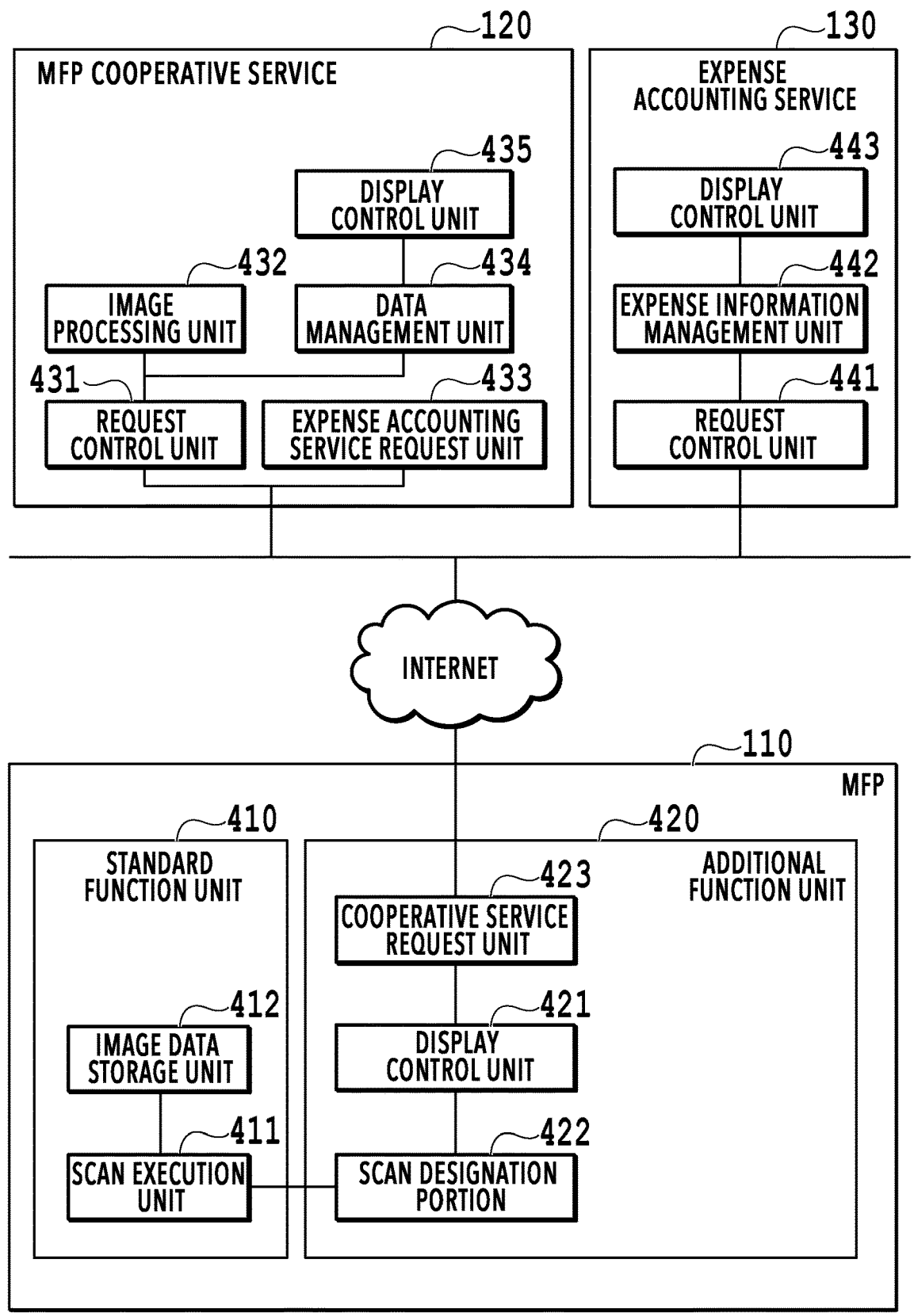
FIG. 4 is a software configuration diagram of the entire system.

FIG. 4 is a software configuration diagram of the image processing system according to the present embodiment. The MFP 110 can be segmented into a standard function unit 410 and an additional function unit 420 in a broad sense. Each unit included in the standard function unit 410 is provided in the MFP 110 as a standard, whereas each unit included in the additional function unit 420 is an application additionally installed in the MFP 110. The additional function unit 420 is an application based on Java (registered trademark), and adding of functions to the MFP 110 is easily realized. Note that other additional applications that are not illustrated in the drawings may be installed to the MFP 110.

The standard function unit 410 includes a scan execution unit 411 and an image data storage unit 412. The additional function unit 420 includes a display control unit 421, a scan designation portion 422, and a cooperative service request unit 423.

Figure 10:
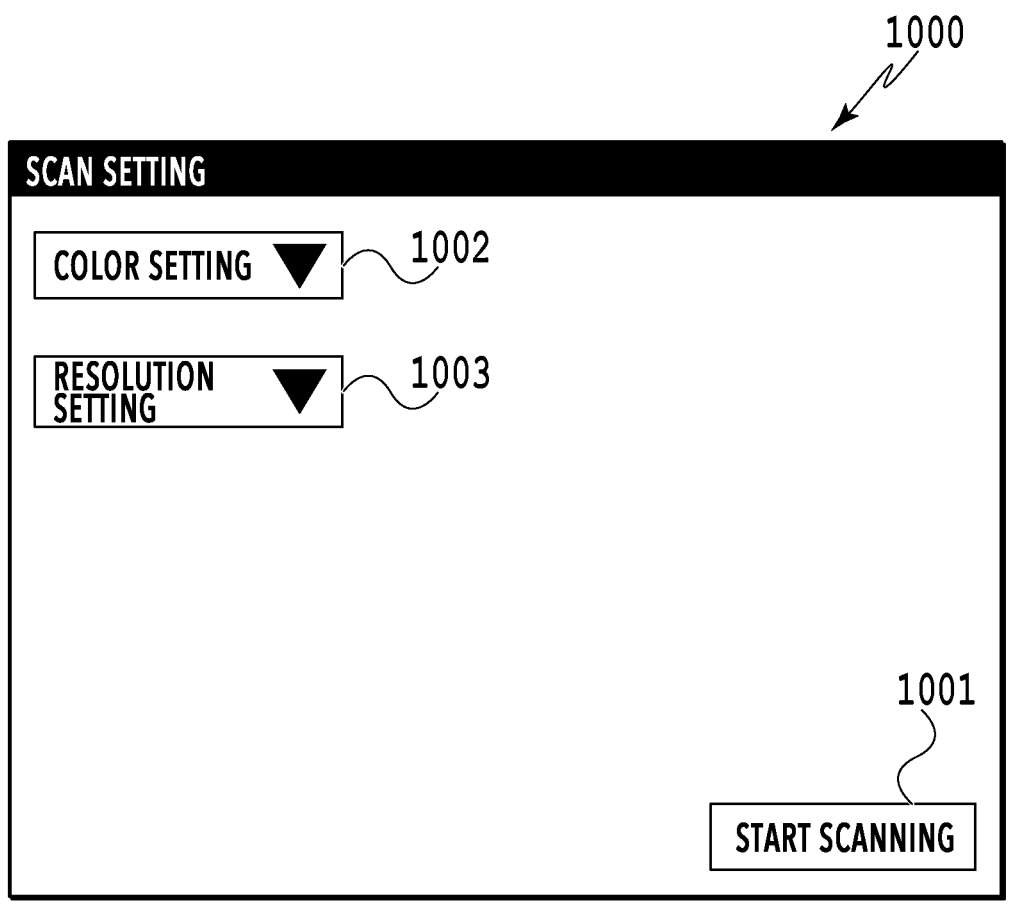
FIG. 10 is a diagram representing a scan setting screen of the MFP.

The display control unit 421 displays a UI screen for accepting an operation input by the user, such as the UI screen represented in FIG. 10, on a liquid crystal display unit having a touch panel function of the operation unit 220 of the MFP 110. By use of such a UI screen, it is possible to accept an input of authentication information for accessing the MFP cooperative service 120, selection of an expense accounting eligible person in a case of scanning by proxy (selection of operator information), a scan setting, and an instruction such as an operation to start scanning and an input of metadata. The scan designation portion 422 requests the scan execution unit 411 to perform scan processing together with a scan setting corresponding to a user instruction that is input via the UI screen.

The scan execution unit 411 receives a scan request including a scan setting from the scan designation portion 422. In accordance with the scan request, the scan execution unit 411 reads a document placed on the document positioning plate made of glass by use of the scanner unit 222 via the scanner I/F 217, in order to generate scanned image data, which is image data of the entire document positioning plate. The generated scanned image data is transmitted to the image data storage unit 412. The scan execution unit 411 transmits a scanned image identifier, which uniquely represents scanned image data that is saved, to the scan designation portion 422. The image data storage unit 412 stores the scanned image data received from the scan execution unit 411 in the HDD 214.

The scan designation portion 422 acquires, from the image data storage unit 412, the scanned image data corresponding to the scanned image identifier received from the scan execution unit 411. The scan designation portion 422 requests the cooperative service request unit 423 for an instruction to perform multi-cropping processing on the acquired scanned image data.

The cooperative service request unit 423 requests the MFP cooperative service 120 for various kinds of processing. For example, the cooperative service request unit 423 requests for login, acquisition of information of a proxy application eligible person (operator information) who is eligible for expense accounting by proxy, multi-cropping processing, acquisition of metadata information, setting of metadata, or the like. Although a protocol such as REST or SOAP is used for communication with the MFP cooperative service 120, other communication means may be used.

The MFP cooperative service 120 includes a request control unit 431, an image processing unit 432, an expense accounting service request unit 433, a data management unit 434, and a display control unit 435.

The request control unit 431 stands by in a status of being able to receive a request from an external apparatus. Upon receiving a processing request, the request control unit 431 provides an instruction for processing to the image processing unit 432, the expense accounting service request unit 433, or the data management unit 434 as appropriate according to the request.

The image processing unit 432 is an image acquisition unit that performs multi-cropping processing or image analysis processing, such as OCR or layout analysis, on image data, so as to acquire document image data.

The expense accounting service request unit 433 requests the expense accounting service 130 for various kinds of processing. For example, the expense accounting service request unit 433 requests for acquisition of a list of proxy application eligible persons, acquisition of a list of expense types, registration of image data of a receipt, and setting of metadata corresponding to image data of a receipt.

The data management unit 434 holds user information, various kinds of setting data, etc., that are managed by the MFP cooperative service 120.

The display control unit 435 returns screen layout information (HTML, CSS, etc.) that is necessary for screen display in response to a request from a web browser operating on another terminal, which is not illustrated in the drawings, such as a PC or a mobile connected via the Internet. The user checks user information registered in the MFP cooperative service 120 or changes settings for scanning, etc., via the screen displayed on the web browser.

The expense accounting service 130 includes a request control unit 441, an expense information management unit 442, and a display control unit 443.

The request control unit 441 stands by in a status of being able to receive a request from an external apparatus. Upon receiving a processing request, the request control unit 441 provides an instruction for processing to the expense information management unit 442 as appropriate according to the request.

The expense information management unit 442 holds expense information registered in the expense accounting service 130.

The display control unit 443 returns screen layout information (HTML, CSS, etc.) that is necessary for screen display in response to a request from a web browser operating on another terminal, which is not illustrated in the drawings, such as a PC or a mobile connected via the Internet. Via the screen displayed on the web browser, it is possible for the user to check expense information, which includes image data of a receipt and information of an expense report registered in the expense accounting service 130, and to input data, etc.

<Overall Processing Flow>

Figure 5B:
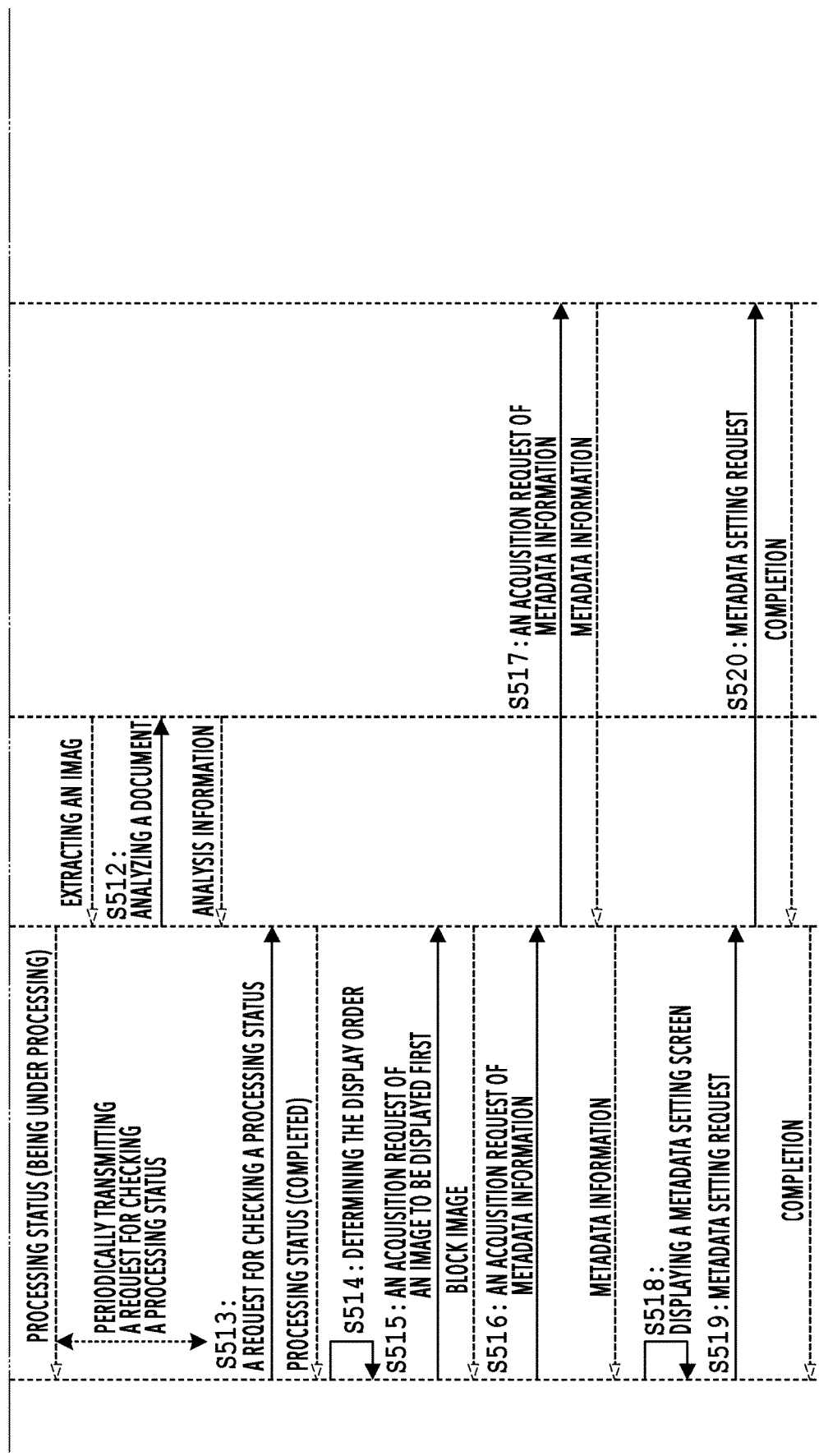

FIG. 5 is a sequence diagram representing a flow of processing among the MFP 110, the MFP cooperative service 120, and the expense accounting service 130 in a case where a receipt is scanned by the MFP 110 and expense information is registered in the expense accounting service 130. Here, with reference to FIG. 5, an explanation is given mainly on communication among the three subjects.

In a normal status, the MFP 110 displays, on a touch panel, a main screen in which buttons for performing respective functions to be provided are arranged.

Figure 6:
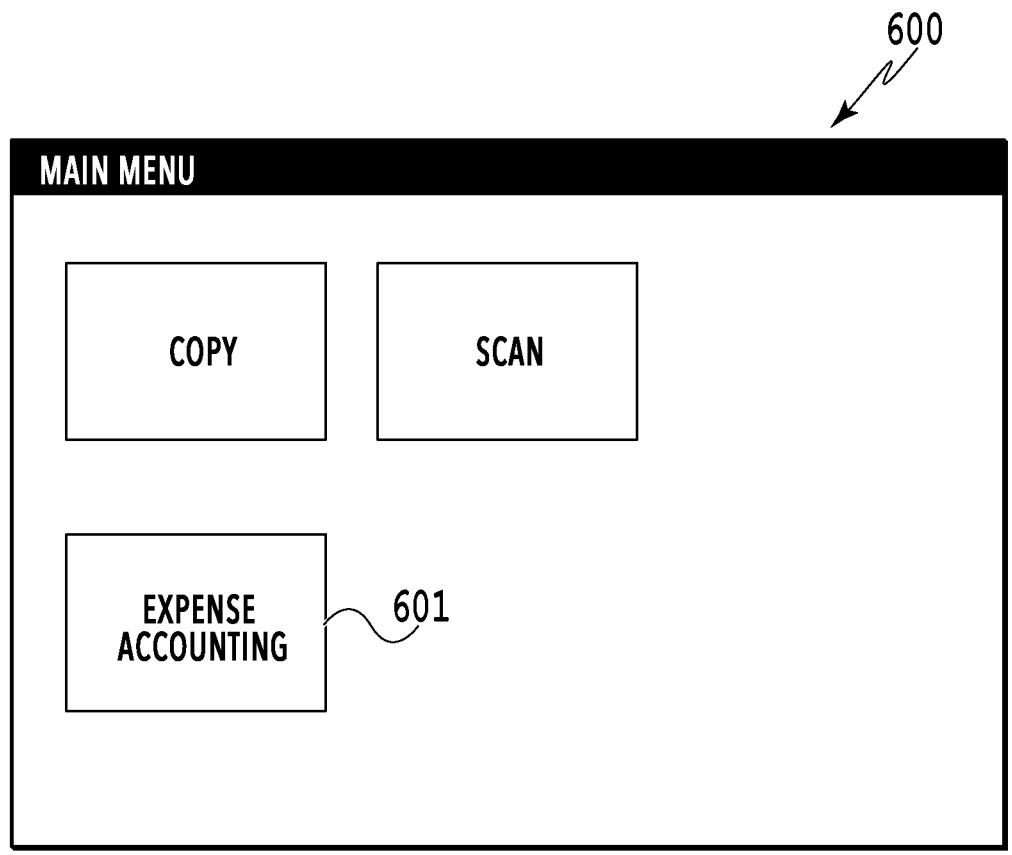
FIG. 6 is a diagram representing a main screen of the MFP.

FIG. 6 is a diagram representing an example of the main screen 600. By installing an additional application for performing expense accounting (hereinafter referred to as an expense accounting application) in the MFP 110, the button 601 for performing expense accounting is displayed on the main screen 600 of the MFP 110. In a case where the button 601 for expense accounting is selected, the expense accounting application is activated and a screen for performing expense accounting is displayed, so that the processing represented in the sequence of FIG. 5 is started.

Figure 7:
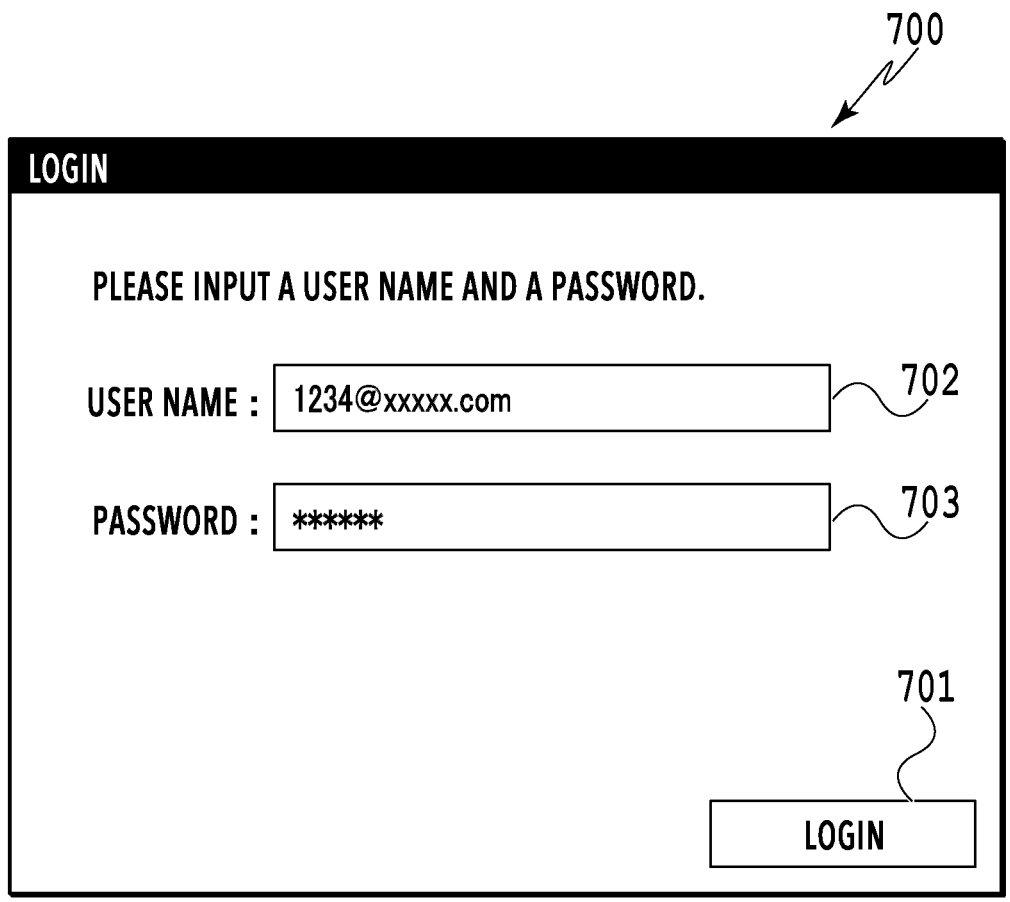
FIG. 7 is a diagram representing a login screen of the MFP.

In S501, the expense accounting application displays a login screen on which authentication information for accessing the MFP cooperative service 120 is input. FIG. 7 represents an example of the login screen 700 displayed on the MFP 110. It is possible for the user to make a login request by inputting the user name and password registered in the MFP cooperative service 120 in the respective box areas 702 and 703 on the login screen 700 and selecting the "LOGIN" button 701.

In a case where the "LOGIN" button 701 is pressed by the user, the expense accounting application transmits the login request to the MFP cooperative service 120 in S502.

In S503, the MFP cooperative service 120 verifies whether the user name and password included in the login request are correct or not and returns an access token to the MFP 110 in a case where the user name and password are correct. Hereinafter, various kings of requests provided from the MFP 110 to the MFP cooperative service 120 are issued together with the above-described access token, so that the user to be the processing target can be identified by use of the access token. As for the method for performing user authentication, a publicly known method (Basic authentication, Digest authentication, authorization by use of OAuth, etc.) in general may be used.

In S504, upon completion of the login processing and receiving the access token, the MFP 110 transmits an acquisition request for proxy application eligible person information to the MFP cooperative service 120. For the request to the MFP cooperative service 120, it is possible to use a protocol such as REST.

In S505, upon receiving the acquisition request for the proxy application eligible person information, the MFP cooperative service 120 transmits an acquisition request for the proxy application eligible person information to the expense accounting service 130 by use of the access token, which is associated with the user of the expense accounting service 130. In the MFP cooperative service 120, the user thereof is associated with the user of the expense accounting service 130 in advance by use of a web browser operating on a PC, etc., that is connected via the Internet. Therefore, it is possible for the expense accounting service 130 to uniquely identify the user of the expense accounting service 130 from among the users of the MFP cooperative service 120. Accordingly, upon receiving the acquisition request for the proxy application eligible person information, the expense accounting service 130 returns, to the MFP cooperative service 120, information of the proxy application eligible person who is set for the user of the expense accounting service 130 corresponding to the user of the MFP cooperative service 120. FIG. 8 represents an example of a format in which proxy application eligible person information returned by the expense accounting service 130 is defined. As the proxy application eligible person information, a list of "UserID" and "UserName" of proxy application eligible persons set for the user of the expense accounting service 130 associated with the user of the MFP cooperative service 120 is acquired. The MFP cooperative service 120 returns the proxy application eligible person information to the MFP 110. Although the data acquired from the expense accounting service 130 is transmitted to the MFP 110 as it is in the explanation here, the data may be converted or the format may be changed as appropriate.

Figure 9:
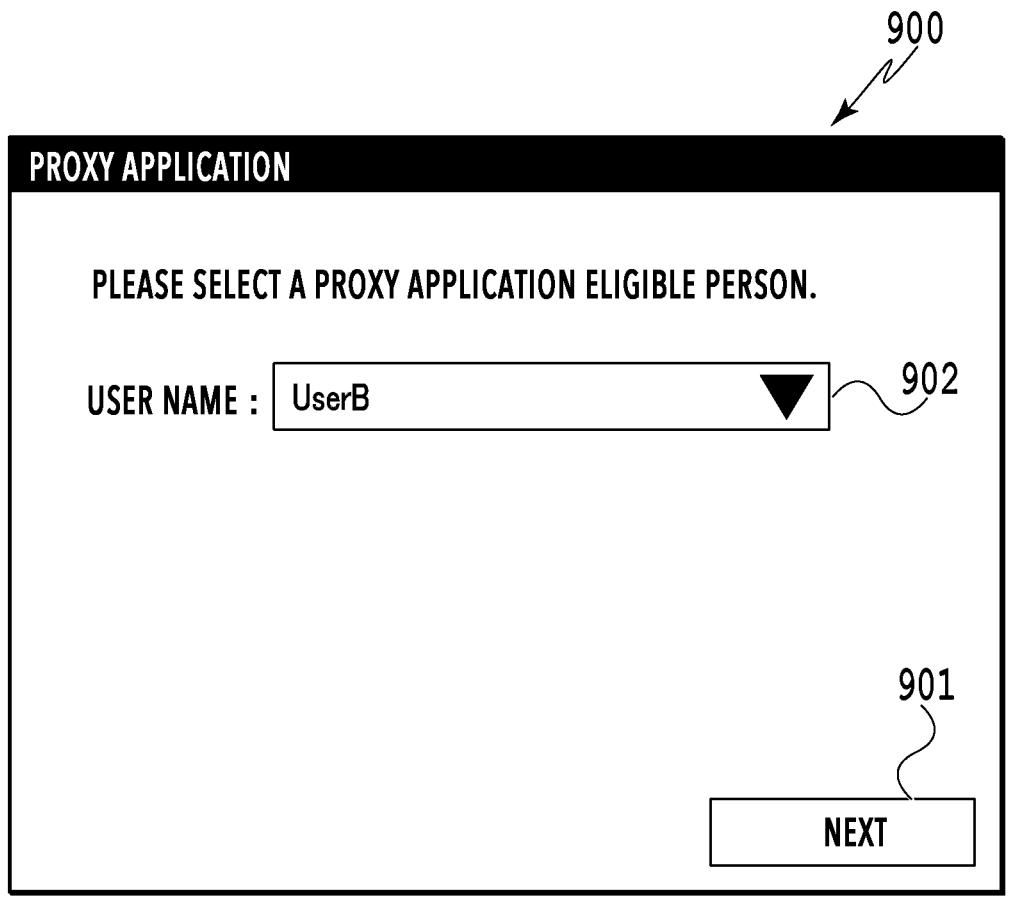
FIG. 9 is a diagram representing a proxy application screen of the MFP.

In S506, the MFP 110 displays a proxy application screen based on the acquired proxy application eligible person information. FIG. 9 is a diagram representing an example of the proxy application screen 900 displayed on the MFP 110. It is possible for the user to select a proxy application eligible person from the user name list 902 and select the "NEXT" button 901 to determine the proxy application eligible person and make the screen transition to the next setting screen.

In S507, the MFP 110 displays a scan setting screen. FIG. 10 is a diagram representing an example of the scan setting screen 1000 displayed on the MFP 110. It is possible for the user to perform various settings related to reading by scanning on the scan setting screen 1000 and make the MFP 110 execute scanning by placing a document to be a scanned target, such as a receipt, on the document positioning plate and selecting the "START SCANNING" button 1001.

In S508, the MFP 110 generates scanned image data, which is image data of the entire document positioning plate that has been read by execution of scanning.

In S509, the MFP 110 transmits an analysis request of the scanned image data to the MFP cooperative service 120.

In S510, upon receiving the analysis request of the scanned image data, the MFP cooperative service 120 starts multi-cropping processing by use of the image processing unit 432 of the MFP cooperative service 120. Thereafter, the MFP cooperative service 120 returns a request ID that uniquely represents the analysis request of the scanned image data to the MFP 110 without waiting for the end of the multi-cropping processing. FIG. 11 is an example of the request ID.

After receiving the analysis request of the scanned image data, in a case where a document is detected as a result of the multi-cropping processing by the image processing unit 432, the MFP cooperative service 120 performs a rotation process, a character recognition (OCR) process, and document type detection on each detected document. In the rotation process, in a case where the read document is inclined relative to a predetermined reference line, the document is corrected such that an edge of the document becomes parallel or perpendicular to the reference line. Further, by detecting the contents thereof, the document is rotated in a direction to make the text of the document be in the correct orientation. Then, character recognition and contents detection are performed, so as to extract a character string of the document and detect the type of the document.

In S511 to S513, the MFP 110 periodically (for example, every 3 seconds) checks the processing status of the image analysis with the MFP cooperative service 120 by use of the request ID received in S510. Although omitted in FIG. 5, the processing of S511 is continued until acquisition of a response indicating completion of image processing by the MFP cooperative service 120 (until the timing of S513). Upon receiving the request for checking the processing status in S511, the MFP cooperative service 120 checks the status of the processing corresponding to the request ID and returns such contents as represented by FIG. 12A in a case of being under processing. In a case where the processing has ended, such contents as represented by FIG. 12B are returned in S513.

The response upon completion of the processing includes information about the result of analysis of the scanned image data as well as the status. In "Images", information for the number of documents detected by the multi-cropping processing is stored. "ImageID" represents an ID of detected document image data, and, in a case where an acquisition request of document image data is transmitted to the MFP cooperative service 120 together with designation of an Image ID, the targeted document image data can be acquired. "ContentsType" represents the type of a detected document. For example, the character string may be "Receipt" for a receipt, "BusinessCard" for a business card, and "DriverLicense" for a license. "ReceiptData" is included in a case where "ContentsType" is "Receipt", which represents a receipt. "ReceiptData" stores values indicating a date and a total money amount, which are acquired as a result of analysis of the contents of a document. "Points" stores coordinates representing an area of document image data in scanned image data, that is, coordinates of an image area in scanned image data corresponding to document image data. From the initial position, the X coordinate of the top left point, the Y coordinate of the top left point, the X coordinate and Y coordinate of the points at positions clockwise about the center of the document from the top left point are stored in that order.

In S514, in response to receiving the response upon completion of processing, the MFP 110 determines the order of the document image data for setting metadata in the processing of S519 by use of the detected information. An explanation is given later of details of the method for determining the order of the document image data.

Subsequently, in S515, the MFP 110 transmits an acquisition request for document image data to the MFP cooperative service 120 with designation of the "ImageID" of the document image to be displayed first. Upon receiving the acquisition request for document image data, the MFP cooperative service 120 transmits the document image data corresponding to the "ImageID" to the MFP 110. The document image data to be returned here is document image data in the corrected orientation as a result of the rotation process.

Next, in S516, the MFP 110 transmits an acquisition request for item information of metadata to the MFP cooperative service 120.

In S517, upon receiving the acquisition request for metadata from the MFP 110, the MFP cooperative service 120 acquires the metadata item information for the target user from the expense accounting service 130.

FIG. 13 is an example of information returned by the MFP cooperative service 120 and the expense accounting service 130 as a response for acquisition of metadata item information. "ExpenseTypes" represents a list of definition values indicating what the receipts registered in the expense accounting service 130 are for. Each type includes "ID" and "Name".

In the embodiment represented in FIG. 13, there is described a format in which information acquired by the MFP cooperative service 120 from the expense accounting service 130 is transmitted to the MFP 110 as it is. However, the present embodiment is not limited thereto. For example, in a case where multiple metadata item information are required, a request may be transmitted to the expense accounting service 130 for each metadata item information to acquire each metadata item information, and the respective information may be combined into one information when returned to the MFP 110. Furthermore, information of items required by the MFP 110 may be extracted from the information transmitted by the expense accounting service 130 and then returned to the MFP 110 from the MFP cooperative service 120 as the metadata item information.

Figure 14:
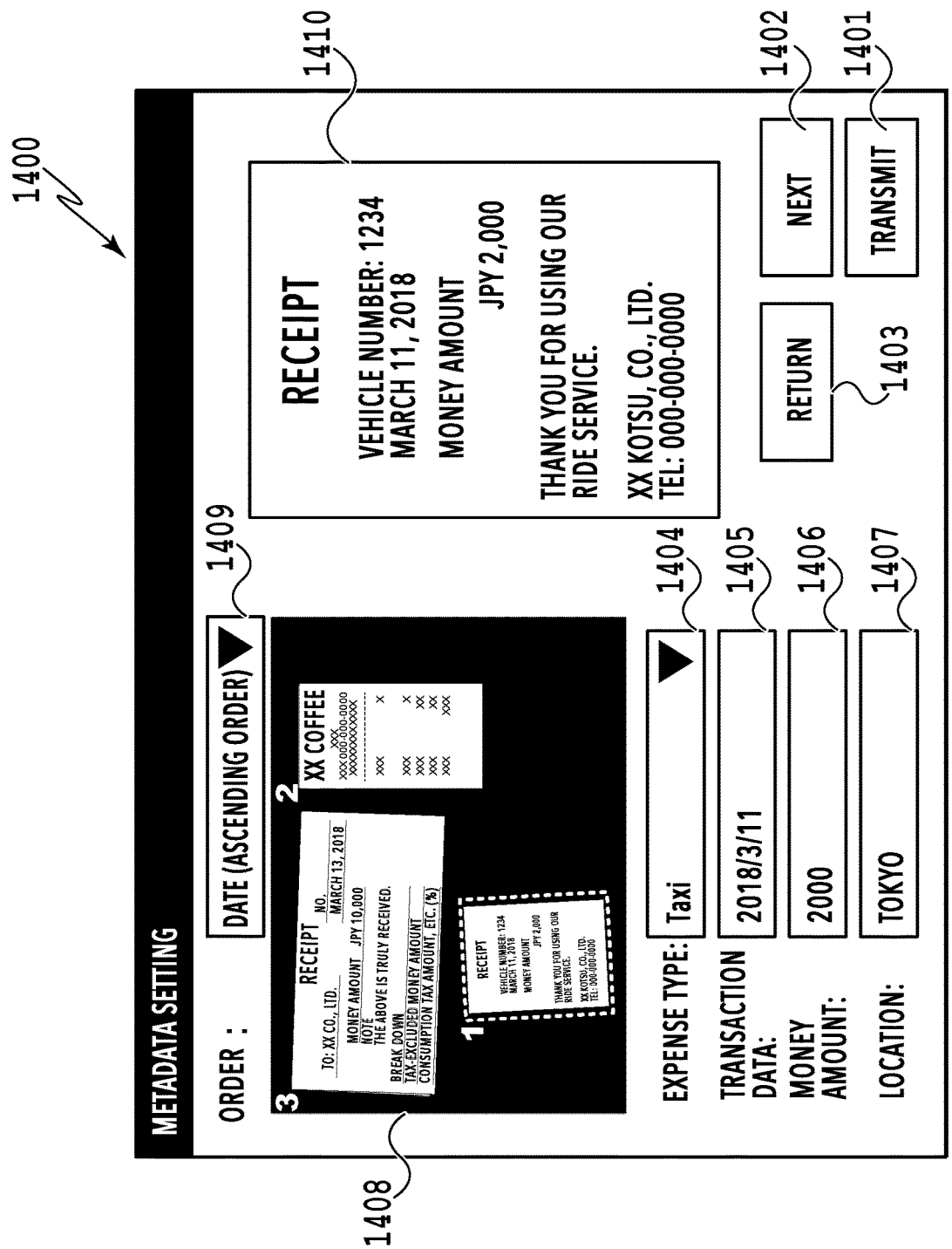
FIG. 14 is a diagram representing a metadata setting screen of the MFP.

In S518, the MFP 110 displays the metadata setting screen 1400 as represented in FIG. 14, based on each of the document image data acquired in S513 and the display order acquired in S514, so as to set metadata for each of detected document image data. An explanation is given later of details of the metadata setting screen 1400. The same number of metadata setting screens 1400 as the number of documents detected after scanning may be displayed, so that the user can set metadata for all of the document image data.

In S519, upon detecting that the "TRANSMIT" button 1401 is pressed by the user, the MFP 110 transmits a metadata setting request to the MFP cooperative service 120 together with the metadata information set on the metadata setting screen 1400. FIG. 15 represents an example of setting data to be transmitted for setting of metadata. The MFP 110 adds information corresponding to contents set on the metadata setting screen 1400, respectively. Note that, since the metadata corresponds to only one document in the example represented in FIG. 15, the same number of metadata setting requests as the number of documents need to be transmitted. However, it is possible that metadata of multiple documents are transmitted at once.

In S520, in response to receiving the metadata setting request, the MFP cooperative service 120 transmits a metadata setting request to the expense accounting service 130, based on the received metadata information. Upon receiving the metadata setting request, the expense accounting service 130 sets the received metadata information to expense information managed by itself and then returns information representing completion of the metadata setting to the MFP cooperative service 120.

Upon receiving the information representing completion of the metadata setting from the expense accounting service 130, the MFP cooperative service 120 returns a notification indicating completion of the metadata setting to the MFP 110.

Upon receiving the notification indicating completion of the metadata setting from the MFP cooperative service 120, the MFP 110 ends the series of processing.

<Details of Processing by MFP>

Figure 16A:
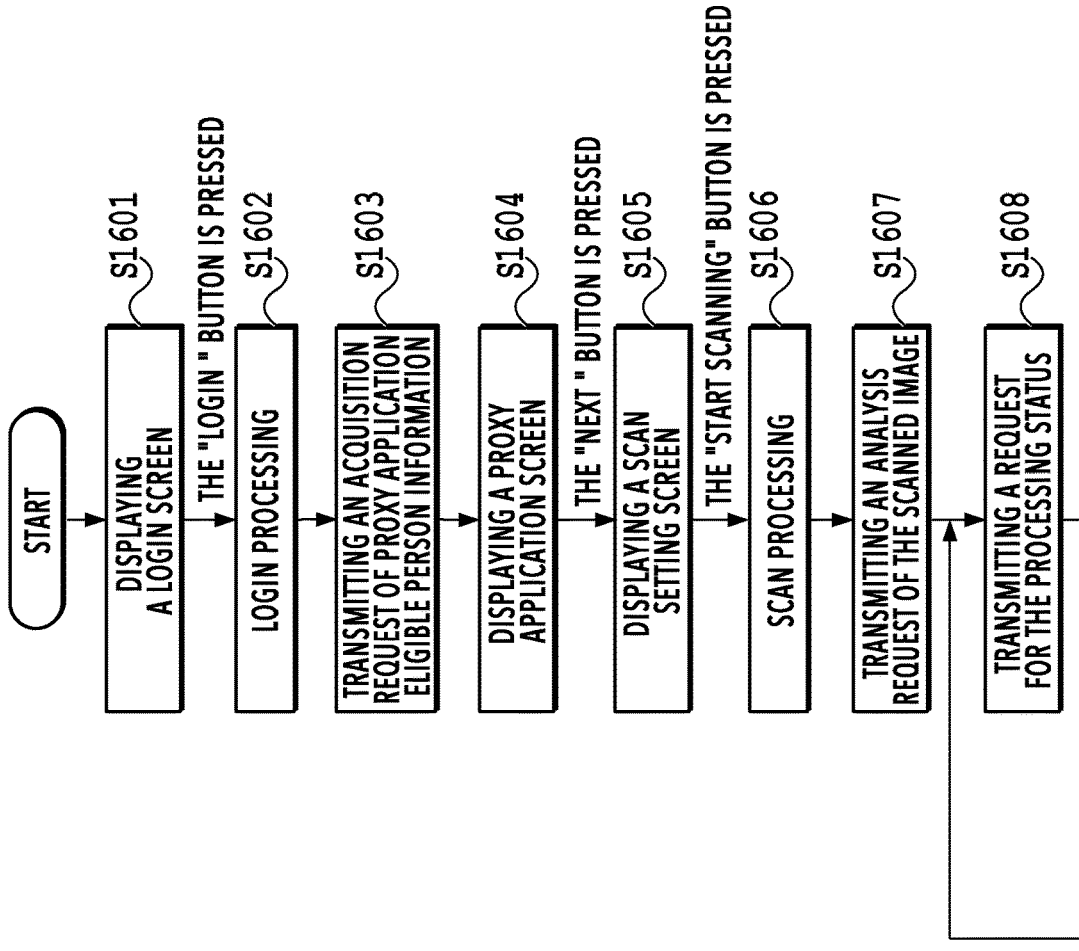
FIGS. 16A and 16B are flowcharts representing expense accounting processing in the MFP.
Figure 16B:
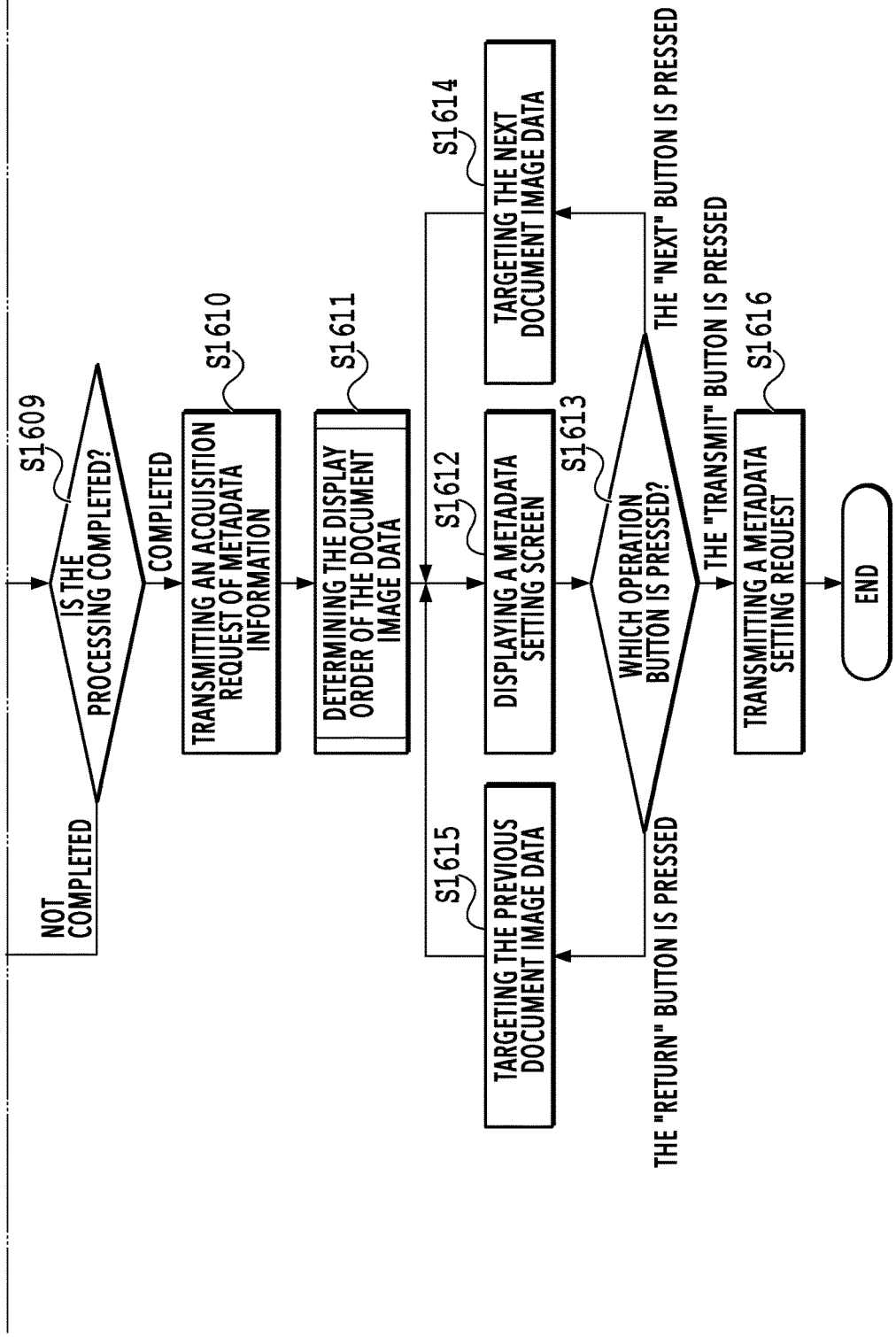

FIG. 16 is a flowchart representing details of processing by the MFP 110 for performing expense accounting processing. The series of processing is realized by the CPU 211 executing a control program stored in the HDD 214 in the control unit 210. A detailed explanation is given below.

This processing is started in a case where it is detected that the "EXPENSE ACCOUNTING" button 601 is pressed on the main screen 600 (FIG. 6) of the MFP 110.

In S1601, the display control unit 421 displays the login screen 700. In order to log in, the user needs to input a user name in the text input area 702, input a password in the text input area 703, and select the "LOGIN" button 701 on the login screen 700. Upon detecting that login information including the user name and the password is input by the user and the "LOGIN" button 701 is pressed, the display control unit 421 transmits a login request to the cooperative service request unit 423.

In S1602, the cooperative service request unit 423 transmits a login request to the request control unit 431 of the MFP cooperative service 120. The request control unit 431 of the MFP cooperative service 120 accesses the data management unit 434 to check whether the login information is correct or not. In a case where the login information is correct, the request control unit 431 returns an access token to the cooperative service request unit 423 of the MFP 110, and the processing jumps to S1603.

In S1603, the cooperative service request unit 423 transmits an acquisition request of proxy application eligible person information to the request control unit 431 of the MFP cooperative service 120 together with the access token. Upon receiving the acquisition request of proxy application eligible person information, the request control unit 431 of the MFP cooperative service 120 requests the expense accounting service request unit 433 for acquisition of proxy application eligible person information. Then, the expense accounting service request unit 433 acquires user information of the expense accounting service 130 associated with the access token. Further, the expense accounting service request unit 433 transmits an acquisition request of the proxy application eligible person information of the target user to the request control unit 441 of the expense accounting service 130. Upon receiving the acquisition request of the proxy application eligible person information, the request control unit 441 of the expense accounting service 130 acquires the proxy application eligible person information of the target user from the expense information management unit 442 and returns the proxy application eligible person information to the expense accounting service request unit 433. Upon receiving the proxy application eligible person information, the expense accounting service request unit 433 returns the proxy application eligible person information to the cooperative service request unit 423 of the MFP 110 through the request control unit 431.

Upon receiving the proxy application eligible person information in S1604, the cooperative service request unit 423 of the MFP 110 transmits the proxy application eligible person information to the display control unit 421. Further, the display control unit 421 displays the proxy application screen 900. It is possible that the processing of S1604 is skipped and the processing of S1605 is executed in a case where there is no proxy application eligible person according to the proxy application eligible person information acquired in the processing of S1603. On the proxy application screen 900, the user needs to select a proxy application eligible person to be used from the proxy application eligible person list 902 and select the "NEXT" button 901 in order to determine a proxy application eligible person. It is possible that a value representing the actual applicant is set in the initial state of the proxy application eligible person list 902 and, in a case where the value is not changed, such processing in which document image data of a document scanned by the actual applicant is registered in the expense accounting service 130 is performed.

In S1605, in a case where the "NEXT" button 901 is pressed, the display control unit 421 displays the scan setting screen 1000. FIG. 10 is a diagram representing an example of the scan setting screen 1000. The "COLOR SETTING" button 1002 is a button for setting polychrome or monochrome for scanning a document. The "RESOLUTION SETTING" button 1003 is a button for setting a resolution for scanning a document. For setting by use of the setting buttons 1002 and 1003, options (choices) that can be set within a range supported by the MFP 110 are displayed, and the user can select a desired one from among the displayed options. Note that the above-described setting buttons are merely examples, and all of the above-described setting items may not be present, or other setting items may be present. Alternatively, setting values of the resolution setting, the color setting, etc., may be limited only to setting values as requested by the expense accounting service 130. The user performs detailed settings for scan processing via such a scan setting screen 1000. The "START SCANNING" button 1001 is a button for instructing start of scan processing for a document set on the document positioning plate, or the like.

In S1606, upon detecting that the "START SCANNING" button 1001 is pressed by the user, the display control unit 421 provides an instruction for scanning to the scan designation portion 422. The scan designation portion 422 instructs the scan execution unit 411 for scanning, so that scanning of the document is performed. The scanned image data generated by scanning is saved in the image data storage unit 412, and an identifier corresponding to the scanned image data is notified to the scan designation portion 422. In S1606, a screen (not illustrated in the drawings) representing that scanning is in progress may be displayed.

Next, in S1607, the cooperative service request unit 423 transmits the scanned image data acquired via the scan designation portion 422 to the request control unit 431 of the MFP cooperative service 120 together with an analysis request of the scanned image. The request control unit 431 extracts the scanned image data from the analysis request of the scanned image and transmits the scanned image data to the image processing unit 432, so that multi-cropping processing is executed. Upon completion of the multi-cropping processing by the image processing unit 432, the request control unit 431 subsequently makes the image processing unit 432 perform an image rotation process, a document type detection process, and a character recognition process. Upon starting the multi-cropping processing, the request control unit 431 immediately returns a request ID to the cooperative service request unit 423 of the MFP 110 without waiting for completion of the processing. The request ID is a value by which an analysis request of a scanned image to be processed in the MFP cooperative service 120 can be uniquely identified.

In S1608, upon acquiring the request ID, the cooperative service request unit 423 transmits an acquisition request of a processing status together with the request ID to the request control unit 431 of the MFP cooperative service 120. The request control unit 431 queries the image processing unit 432 for the status of image processing corresponding to the request ID received together with the acquisition request of the processing status. In a case where the processing corresponding to the request ID is being under processing, the image processing unit 432 returns information representing being under processing. In a case where the processing is completed, the image processing unit 432 returns information representing completion, processing results of multi-cropping (position information of each document as well as image data of each document), and analyzing results of various types of images (a determination result of the document type of each document image as well as a result of the character recognition process) to the request control unit 431. The request control unit 431 creates response data for the acquisition request of the processing status, based on the information processed by the image processing unit 432, and returns the response data to the cooperative service request unit 423 of the MFP 110.

In S1609, the cooperative service request unit 423 determines whether the acquired processing status is a value representing being under processing or not. In a case where the processing status is a value representing being under processing, the processing returns to S1608 after a few seconds or so, so that the cooperative service request unit 423 performs the processing of transmitting the request of checking the processing status again. In a case where the processing status is a value representing completion, the cooperative service request unit 423 acquires analysis information included in the response to the request of checking the processing status.

In S1610, the cooperative service request unit 423 transmits an acquisition request of metadata item information to the request control unit 431 of the MFP cooperative service 120 together with the access token. Upon receiving the acquisition request of metadata item information, the request control unit 431 requests the expense accounting service request unit 433 to acquire metadata item information. Then, the expense accounting service request unit 433 acquires the user information of the expense accounting service 130 associated with the access token and transmits an acquisition request of the metadata item information corresponding to the target user to the request control unit 441 of the expense accounting service 130. Upon receiving the request, the request control unit 441 acquires the metadata item information from the expense information management unit 442 and returns the metadata item information to the expense accounting service request unit 433 of the MFP cooperative service 120. Upon receiving the metadata item information, the expense accounting service request unit 433 returns the metadata item information to the cooperative service request unit 423 of the MFP 110 through the request control unit 431.

Figure 17:
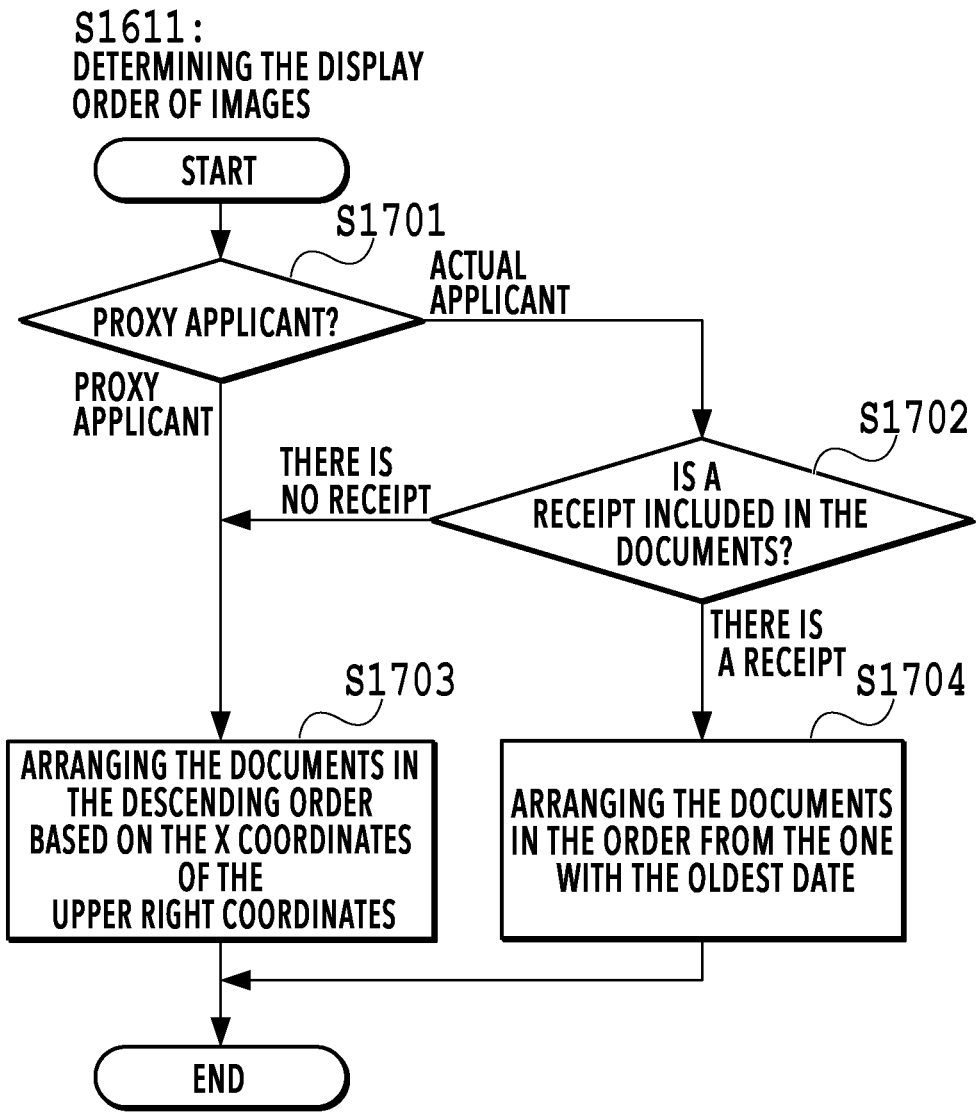
FIG. 17 is a flowchart representing processing for determining the display order of document image data.

In S1611, the display control unit 421 of the MFP 110 determines the display order of each document image data, based on the response data acquired in S1608. FIG. 17 is a flowchart representing details of the processing performed by the MFP 110 for determining the display order of multiple document image data in S1611. The series of processing is realized by the CPU 211 executing a control program stored in the HDD 214 in the control unit 210. A detailed explanation is given below.

In S1701, the display control unit 421 of the MFP 110 determines whether a proxy application eligible person is selected in S1604 or not. In a case where a person other than the actual applicant makes an application by proxy, the processing proceeds to S1703, in which document image data are rearranged so as to be displayed in order from the document image data having the largest X coordinate of the upper right corner of the image area, which is the corresponding position information in the scanned image data. The position information including the coordinates can be acquired from the response data acquired in S1608. In the case of the response data in FIG. 12B, the third values of "Points" are the X coordinates of the upper right corners. In the case of FIG. 12B, the document image data are arranged in the order of "image0001", "image0002", and "image0003" with respect to ImageID in the case of being arranged in an order based on the coordinates. The reason why the document image data are arranged in descending order with respect to the X coordinates of the upper right corners is that, since a document is supposed to be placed on the document positioning plate near the upper left corner thereof, in a case where there are multiple documents, the documents tend to be placed from the left side. In a case where a receipt, or the like, is placed on the document positioning plate, since the plane to be scanned is faced down, the image area corresponding to the document placed on the upper left corner is positioned on the upper right corner in the scanned image data. Therefore, the document image data are displayed in descending order with respect to the X coordinates with reference to the coordinates of the upper right corners. In addition, in the case of a proxy applicant other than the actual applicant, there is a high possibility that the person does not grasp the contents of a document. Therefore, there is a high possibility that it is easier for the person to understand the order in a case where document image data are displayed based on the position relationship of the documents arranged by the proxy applicant. Note that a coordinate and axis direction to be the reference may be something other than the above.

In a case of determining that the actual applicant is selected in S1701, the display control unit 421 determines whether the document image data includes information related to a receipt or not in S1702. Whether document image data corresponds to a receipt or not can be acquired from the response data acquired in S1608. In the case of the response data in FIG. 12B, it is represented that the document image data whose "ContentsType" is "Receipt" are recognized as receipts.

In S1704, in a case where it is determined that a document corresponding to document image data is a receipt, the display control unit 421 rearranges the document image data so as to be displayed in order from one with the oldest date. Date information including the date can be acquired from the response data acquired in S1608. In the case of the response data in FIG. 12B, values of "Date" in "ReceiptData" are date data. The date information is obtained based on a text of a date recognized from document image data by the image processing unit 432 of the MFP cooperative service 120. In such numeric values, the first four digits represent a year, the subsequent two digits represent a month, and the last two digits represent a day. In the case of FIG. 12B, the document image data are arranged in the order of "image0002", "image0003", and "image0001" with respect to ImageID in a case of being arranged in the order from the oldest date. In a case where multiple documents have the same date, the document image data of the same date may be rearranged in an order based on the coordinates. Furthermore, in a case where date and time information, or the like, can be additionally acquired, the document image data may be rearranged by use of the information. There may be document image data that is not a receipt, document image data that does not include a date even though the document image data is a receipt, or document image data whose date cannot be correctly obtained due to failure of character recognition. In such a case, the document image data whose date can be obtained may be rearranged first, and then the remaining document image data may be rearranged in an order based on the coordinates and displayed. In S1703, in a case where document image data of a receipt is not included, the display control unit 421 rearranges the document image data in an order based on the X coordinates of the upper right corners of the image areas corresponding to the scanned image data as described above.

Returning to FIG. 16, in S1612, the display control unit 421 displays a metadata setting screen 1400. FIG. 14 is a diagram representing an example of the metadata setting screen 1400. The "TRANSMIT" button 1401 is a button for performing processing of transmitting the metadata set in the box areas 1404 to 1407 to the MFP cooperative service 120. The setting may be in an invalid status until metadata is set for all document image data. The "NEXT" button 1402 is a button for displaying a metadata setting screen for the next document image data. The "NEXT" button 1402 may be in a non-display form in a case where the last document image data is displayed. The "RETURN" button 1403 is a button for displaying a metadata setting screen for the previous document image data. The "RETURN" button 1403 may be in a non-display form in a case where the first document image data is displayed.

The expense type selection list 1404 is a list for selecting the expense type of the receipt corresponding to the document image data to be the setting target, which is displayed in the document image display area 1410. The expense type list displayed in the document image display area 1410 is based on the information acquired in S1610. In the example of FIG. 13, a "Name" list is displayed. The transaction date text input area 1405 is an input area for inputting the transaction date of the receipt corresponding to the document image data to be the setting target. In the initial state, according to the response data acquired in S1608, "Date" of "ReceiptData" of the document image data being displayed is input. In a case where a date is not included, the current date set in the MFP 110 is input. In a case where the transaction date text input area 1405 is selected, a keyboard is displayed (not illustrated in the drawings) on the screen, so that a given date can be input. The money amount text input area 1406 is an input area for inputting the total money amount of the receipt corresponding to the document image data to be the setting target. In the initial state, according to the response data acquired in S1608, "Amount" of "ReceiptData" of the document image data being displayed is input. In a case where the money amount text input area 1406 is selected, a keyboard is displayed (not illustrated in the drawings) on the screen, so that a given numeric value can be input. The place text input area 1407 is an input area for inputting the location where the receipt corresponding to the document image data to be the setting target is issued. In a case where the place text input area 1407 is selected, a keyboard is displayed (not illustrated in the drawings) on the screen, so that a given character string can be input. It is possible that location list information is additionally acquired in the metadata information acquired in S1610, so as to display the list.

The scanned image display area 1408 is an area in which the entire scanned image is displayed in a reduced size. If the scanned image data is displayed as it is, a document placed on the left side from the view of the operator who placed the document is displayed on the right side. Therefore, an image in a position relationship with the left and right inversed is displayed. However, if the scanned image data is displayed with the left and right simply inversed, the contents of the document are also displayed in the inversed manner. Therefore, for example, the left and right may be inversed again within each of the image areas corresponding to the documents. With such processing, it is possible to display an image of which a position relationship among image areas corresponding to documents of scanned image data is left-right inversed but each of the image areas corresponding to the documents is not left-right inversed.

Furthermore, in the present embodiment, numbers representing the display order are superimposed on the displayed image of the scanned image data and displayed at the locations corresponding to the documents. Further, the image area corresponding to the document image data that is currently displayed in the document image display area 1410 is displayed with highlighting so as to be identifiable. In addition, it is possible to change display of an image area corresponding to document image data to which metadata has already been set, such that it is represented that processing has already been done. Furthermore, by selecting a document image on the scanned image display area 1408, the document image can be displayed in the document image display area 1410.

A display order selection list 1409 is a list for selecting the display order of multiple document image data generated by multi-cropping processing. It is possible that the order is changed over to various orders, such as the date order and arrangement order. In a case where the order is changed, the document image data in the initial position in the changed order is displayed, and the order displayed in the scanned image display area 1408 is also changed over to the changed order. For example, in a case where the arrangement order (from the left) is selected in the display order selection list 1409 in the display form illustrated in FIG. 14, the document image data to be displayed first in the arrangement order is displayed in the document image display area 1410 as illustrated in FIG. 18. Note that, in a case where the order is changed after setting of metadata is done for some document image data, if one of the processed document image data is in the top position, it is possible to skip the processed document image data and display the unprocessed document image data with the earliest number in the order.

In S1613, the display control unit 421 determines the button selected on the metadata setting screen 1400.

In a case where the display control unit 421 detects that the "NEXT" button 1402 is pressed in S1613, the processing jumps to S1614. Then, the display control unit 421 targets the next document image data of the document image data being displayed and returns to S1612 to display a metadata setting screen for the targeted document image data.

In a case where the display control unit 421 detects that the "RETURN" button 1403 his pressed in S1613, the processing jumps to S1615. Then, the display control unit 421 targets the previous document image data of the document image data being displayed and returns to S1612 to display a metadata setting screen for the targeted document image data.

In a case where the display control unit 421 detects that the "TRANSMIT" button 1401 is pressed in S1613, the processing jumps to S1616. Then, the cooperative service request unit 423 transmits, to the request control unit 431, a metadata setting request for setting the contents set on the metadata setting screen for the corresponding document image data, respectively. FIG. 15 represents an example of the metadata setting request transmitted to the MFP cooperative service 120. The request includes information representing an expense type (ExpenseTypeID), a transaction date (TransactionDate), a money amount (Amount), and a location (Location), which are set on the metadata setting screen 1400. "ImageID" is designated by a URL parameter or a URL itself to which the request is transmitted.

Upon receiving the metadata setting request, the request control unit 431 requests the expense accounting service request unit 433 for setting of metadata. Then, the expense accounting service request unit 433 acquires the user information of the expense accounting service 130 associated with the access token and transmits a metadata setting request for the target user to the request control unit 441 of the expense accounting service 130. Upon receiving the request, the request control unit 441 of the expense accounting service 130 performs, on the expense information management unit 442, setting of metadata information of the receipt for the document image data corresponding to "ImageID" included in the request. Upon receiving the information, the expense accounting service request unit 433 returns information representing completion of the setting to the cooperative service request unit 423 of the MFP 110 through the request control unit 431. Upon receiving the information representing completion of the setting from the MFP cooperative service 120, the cooperative service request unit 423 ends the processing.

<Application to Other Services>

In the above-explained example, the document image data of a scanned receipt and metadata corresponding to the document image data are set to the expense accounting service 130. However, it is also possible to adapt the present embodiment for a case of cooperating with another service. For example, such a configuration as the metadata setting screen suggested in the present embodiment may be adapted for a case of applying to a business card management service, etc. As for business cards, operation may be easier in a case where business cards are displayed in order for each group of people who belong to the same company. Therefore, it is also possible that the display order of document image data is determined based on a similarity level search of document image data or layout information of the included contents, which is obtained in such document analysis processing by the MFP cooperative service 120 as explained in S512.

<Operation when Scanning Multiple Sheets>

In the above-explained example, the explanation is given with an operation in a case where scanning is performed once. However, it is also possible that scanning is performed multiple times and that scanning is performed one by one for multiple receipts in a standard size such as A4 by use of an ADF (Auto Document Feeder), or the like. For example, in a case of scanning multiple receipts arranged on the document positioning plate multiple times, an item for selecting scanning multiple times is provided on the scan setting screen 1000 (FIG. 10). Further, it is also possible that an analysis request of a scanned image of S1607 is provided for multiple scanned image data after scanning. In that case, it is also possible that all of the document image data corresponding to receipts, which are obtained by analyzing multiple scanned image data, are rearranged and displayed in the rearranged order. There, in the scanned image display area 1408 of the metadata setting screen 1400, scanned image data including the image area corresponding to the document image data for which metadata is being set is displayed. Furthermore, by additionally displaying which number of scanned image data the displayed scanned image data is, it is possible to display in such a manner that the user can easily grasp the location of a receipt in which number of scanned image data.

Similarly, in a case where scanning is performed one by one from the ADF, analysis is performed for all of the scanned image data after scanning all of the documents. Here, since multi-cropping processing is not necessary, it is also possible that such a parameter indicating not to perform multi-cropping in a case of scanning from the ADF is added to the request, so as to notify the MFP cooperative service 120 that multi-cropping processing is not required. In a case of scanning from the ADF, display on the scanned image display area 1408 is not necessary. Therefore, alternatively, it is also possible that the document image data for which metadata is being set and the document image data generated by scanning before and after the document image data for which metadata is being set are displayed in an arranged manner. Furthermore, it is also possible to display which number of scanned document each document image data corresponds to.

<Setting of Display Order>

The display order in the initial state may be changed on a display order setting screen that is separately provided. Setting on a display order setting screen can be performed through an icon button, or the like, which is provided somewhere on the metadata setting screen for displaying the display order setting screen, for example.

Figure 19:
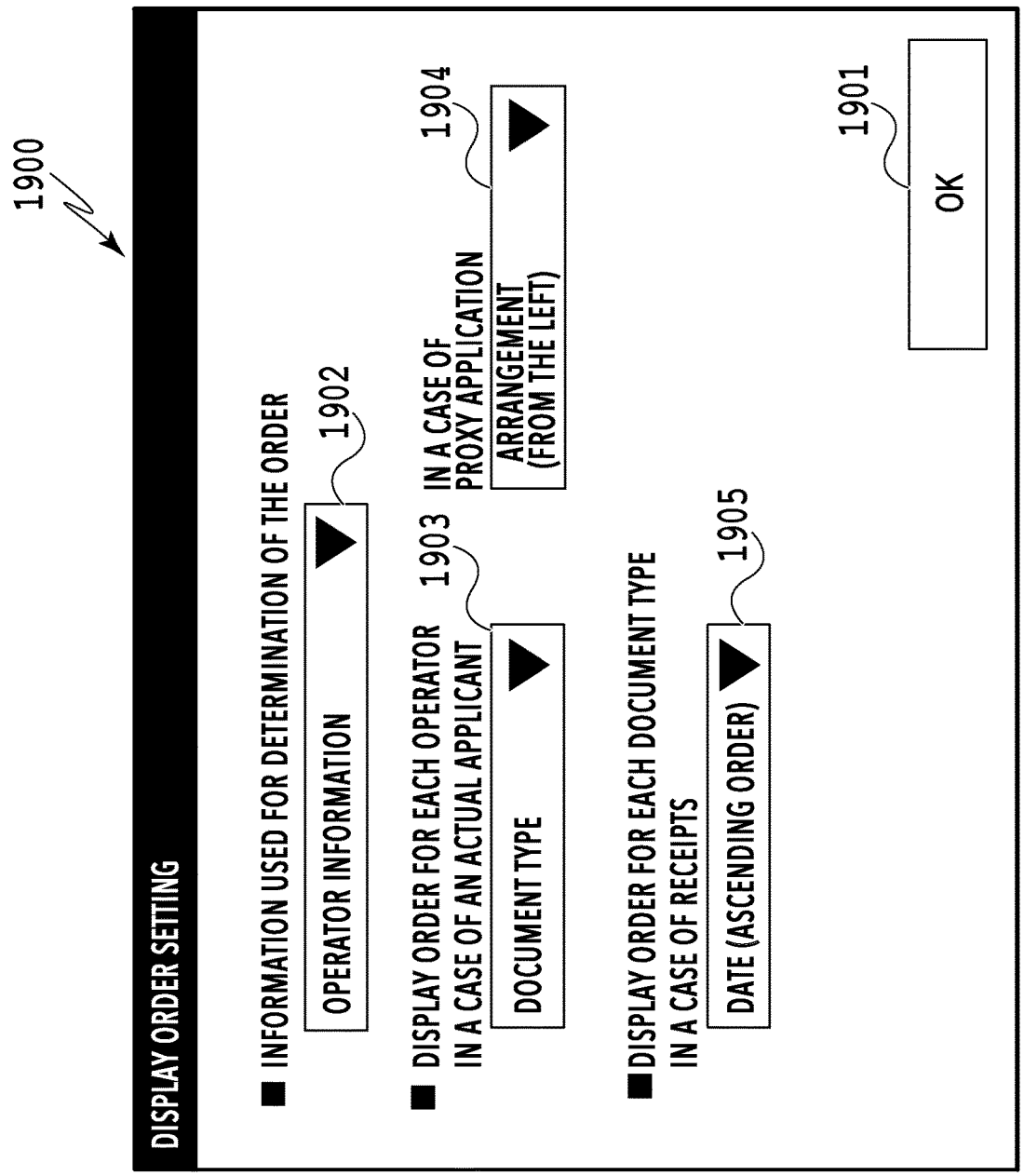
FIG. 19 is a diagram representing a display order setting screen of the MFP.

FIG. 19 is a diagram representing an example of the display order setting screen 1900. The "OK" button 1901 is a button for saving the contents set on the display order setting screen 1900 and returning to the screen displayed before the setting screen is displayed. In a case of transitioning from the metadata setting screen 1400 to the display order setting screen 1900, it is possible to reflect the setting and change the display order immediately when returning to the metadata setting screen 1400, or it is possible to use the changed setting from the next time of scanning.

The order determination information selection list 1902 is a list for selecting order determination information for determining the display order in a case of determining the display order. For example, the order determination information includes "OPERATOR INFORMATION" and "DOCUMENT TYPE". In a case where "OPERATOR INFORMATION" is selected, the order is determined by use of operator information. In a case where "DOCUMENT TYPE" is selected, the order is determined by use of document type information. In a case where "OPERATOR INFORMATION" is selected in the order determination information selection list 1902, the display order is determined by use of the contents set in the lists 1903 and 1904. In a case where the operator is the actual applicant, the order is determined by the method set in the list 1903. Further, in a case where the proxy application processing is performed by a person other than the actual applicant, the order is determined by the method set in the list 1904.

According to the setting in the status of FIG. 19, the order is determined by use of the document type in a case of the actual applicant. Further, in a case of a proxy application, documents are displayed from the one placed on the left side. In a case where "DOCUMENT TYPE" is selected in the order determination information selection list 1902 or in a case where "DOCUMENT TYPE" is selected in the list 1903 or list 1904, the display order is determined by use of the contents set in the list 1905. According to the setting in the example of the list 1905 in FIG. 19, in a case where the types of documents are receipts, the documents are displayed in order from the one with the oldest date.

<Function Assignment for Each Apparatus>

In the explanation of the above-described embodiment, the MFP 110, the MFP cooperative service 120, and the expense accounting service 130 cooperate with each other in order to realize the functions. However, another configuration may be employed. For example, the MFP 110 may have the function of the MFP cooperative service 120, so that the configuration only includes the MFP 110 and the expense accounting service 130.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the technology of the present disclosure, in a case where multiple documents are placed on a document positioning plate, it is possible to display document images on a UI screen in such a manner that the user can easily check the correspondence relationship between the document images being displayed on the UI screen and the corresponding documents placed on the document positioning plate.

This application claims the benefit of Japanese Patent Application No. 2019-023573 filed Feb. 13, 2019, which is hereby incorporated by reference wherein in its entirety.

What is claimed is:

1. An image processing apparatus comprising:
a memory that stores instructions; and
a processor that executes the instructions to:
(1) acquire position information of each of a plurality of document image areas, which are identified on scanned image data, and information of an analyzing result obtained by analysis of document image data corresponding to each of the plurality of document image areas; and
(2) control a display apparatus to display at least the scanned image data and the information of the analyzing result corresponding to one of the plurality of document image areas,
wherein the one of the plurality of document image areas corresponding to the displayed information of the analyzing result is highlighted on the displayed scanned image data.

2. The image processing apparatus according to claim 1, wherein at least one of a multi-cropping processing and the analysis of document image data corresponding to each of the plurality of document image areas is executed by an apparatus other than the image processing apparatus.

3. The image processing apparatus according to claim 1, wherein the processor executes the instructions to further determine an order for displaying the analyzing result corresponding to the one of the plurality of document image areas to be displayed together with the scanned image data on the display apparatus.

4. The image processing apparatus according to claim 3, wherein the processor executes the instructions to further control the display apparatus to display, on the scanned image data, information representing the order determined for each of the plurality of document image areas.

5. The image processing apparatus according to claim 3, wherein the order is determined by use of information about a type of a document included in the analyzing result of the document image data.

6. The image processing apparatus according to claim 5, wherein the image processing apparatus further acquires operator information, and
wherein the order is determined based on the operator information.

7. The image processing apparatus according to claim 3, wherein the order is determined by use of the position information of the plurality of document image areas corresponding to the document image data in the scanned image data.

8. The image processing apparatus according to claim 3, wherein the order is determined by use of date information included in a document corresponding to the document image data.

9. The image processing apparatus according to claim 3, wherein the determined order is changed based on an input provided by an operator.

10. The image processing apparatus according to claim 1, wherein the processor executes the instructions to further control the display apparatus to display the scanned image data, the information of the analyzing result corresponding to the one of the plurality of document image areas, and one of document images that are multi-cropped from the scanned image data, and
wherein the displayed one of document images is a document image corresponding to the one of the plurality of document image areas that is highlighted.

11. The image processing apparatus according to claim 1, wherein the scanned image data is displayed in a left-right inversed manner.

12. The image processing apparatus according to claim 1, wherein the information of the analyzing result is used as metadata related to the document image data.

13. The image processing apparatus according to claim 12, wherein the processor executes the instructions to further control the display apparatus to change on the displayed scanned image data the display of the document image area whose meta data is confirmed by a user.

14. The image processing apparatus according to claim 12, wherein the metadata related to a predetermined item is set, the predetermined item being determined based on information about a type of a document corresponding to the document image data.

15. An image processing method comprising:
acquiring position information of each of a plurality of document image areas, which are identified on scanned image data, and information of an analyzing result obtained by analysis of document image data corresponding to each of the plurality of document image areas; and
controlling a display apparatus to display at least the scanned image data and the information of the analyzing result corresponding to one of the plurality of document image areas,
wherein the one of the plurality of document image areas corresponding to the displayed information of the analyzing result is highlighted on the displayed scanned image data.

16. A non-transitory computer-readable storage medium storing a program for causing a computer to perform:
acquiring position information of each of a plurality of document image areas, which are identified on scanned image data, and information of an analyzing result obtained by analysis of document image data corresponding to each of the plurality of document image areas; and
controlling a display apparatus to display at least the scanned image data and the information of the analyzing result corresponding to one of the plurality of document image areas,
wherein the one of the plurality of document image areas corresponding to the displayed information of the analyzing result is highlighted on the displayed scanned image data.

* * * * *